United States Patent
Lin

(10) Patent No.: US 8,723,800 B2
(45) Date of Patent: May 13, 2014

(54) VIRTUAL PROJECTING INPUT SYSTEM AND INPUT DETECTING METHOD THEREOF

(75) Inventor: Wei-Chih Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 264 days.

(21) Appl. No.: 13/410,297

(22) Filed: Mar. 2, 2012

(65) Prior Publication Data

US 2013/0162598 A1    Jun. 27, 2013

(30) Foreign Application Priority Data

Dec. 22, 2011 (CN) .......................... 2011 1 0434808

(51) Int. Cl.
*G06F 3/02* (2006.01)

(52) U.S. Cl.
USPC ............................. 345/168; 345/156; 345/170

(58) Field of Classification Search
USPC .......... 345/156, 158, 166, 168, 170, 171, 172
See application file for complete search history.

(56) References Cited

U.S. PATENT DOCUMENTS

| | | | | |
|---|---|---|---|---|
| 6,614,422 | B1 * | 9/2003 | Rafii et al. | 345/168 |
| 6,750,849 | B2 * | 6/2004 | Potkonen | 345/168 |
| 6,798,401 | B2 * | 9/2004 | DuFaux | 345/168 |
| 7,215,327 | B2 * | 5/2007 | Liu et al. | 345/168 |
| 7,242,388 | B2 * | 7/2007 | Lieberman et al. | 345/158 |
| 7,768,505 | B2 * | 8/2010 | Ishihara | 345/175 |
| 8,123,361 | B2 * | 2/2012 | Nagashima et al. | 353/30 |
| 2009/0128716 | A1 | 5/2009 | Nagashima et al. | |
| 2011/0058109 | A1 | 3/2011 | Nishigaki et al. | |

\* cited by examiner

*Primary Examiner* — Duc Dinh
(74) *Attorney, Agent, or Firm* — Jianq Chyun IP Office

(57) ABSTRACT

An input detecting method used for a virtual projecting input system includes: emitting an image light beam through a reflecting mirror, and the image light beam forming a projecting point on a projecting plane; enabling the reflecting mirror to swing, so as to enable the image light beam to swing, and the projecting point scanning back and forth on the projecting plane, and generating an input image; detecting a swing frequency of the reflecting mirror, and generating a frequency signal; judging whether an input action occurs, and if yes, generating a detecting signal; and analyzing a phase difference between the frequency signal and the detecting signal, and calculating an input position of the input action according to the phase difference.

20 Claims, 8 Drawing Sheets

VIRTUAL PROJECTING INPUT SYSTEM AND INPUT DETECTING METHOD THEREOF

CROSS-REFERENCE TO RELATED APPLICATION

This application claims the priority benefit of China application serial no. 201110434808.7, filed on Dec. 22, 2011. The entirety of the above-mentioned patent application is hereby incorporated by reference herein and made a part of this specification.

BACKGROUND OF THE INVENTION

1. Field of the Invention

The present invention generally relates to a virtual projecting input system and an input detecting method thereof, in particular, to a virtual projecting input system used to generate a virtual input image by applying laser projection, and an input detecting method thereof.

2. Description of Related Art

A method for generating a virtual input image in a projecting manner may solve a problem of inconvenience of carrying when the virtual input image is generated as a physical input device in conventional way. Through the virtual input image generated in the projecting manner, a user may input information as using the physical input device, and after a relevant detecting system detects and analyzes a relative position of the user on the virtual input image, the information to be input by the user may be judged.

Generally, the detecting system performs scanning or scattering by using a detecting light beam, and when the detecting light beam encounters the user, a reflected light or scattered light may be formed, and is received by a light detecting element, so as to obtain an input position of the user by using an operation system. Therefore, in addition to requiring a projecting device to generate the virtual input image, a virtual projecting input system generating a virtual input image in a projecting manner further requires an detecting light source, additionally, to detect the input position of the user, so that a plurality of complicated elements exists, thereby resulting in inconvenience in application.

Therefore, it is continuously researched how to adopt less elements and effectively detect an input position on a virtual image.

SUMMARY OF THE INVENTION

Accordingly, the present invention is directed to a virtual projecting input system and an input detecting method thereof, in which an additional detecting light source is not required, and an input position of a touch object on a projecting image may be effectively detected.

In an embodiment, the present invention provides an input detecting method used for a virtual projecting input system, which includes: emitting an image light beam through a reflecting mirror, and the image light beam forming a projecting point on a projecting plane; enabling the reflecting mirror to swing, so as to enable the image light beam to swing, and the projecting point scanning back and forth on the projecting plane, and generating an input image; detecting a swing frequency of the reflecting mirror, and generating a frequency signal; judging whether an input action occurs, and if yes, generating a detecting signal; and analyzing a phase difference between the frequency signal and the detecting signal, and calculating an input position of the input action according to the phase difference.

In an embodiment, the present invention also provides an input detecting method used for a virtual projecting input system, which includes: emitting an image light beam through a reflecting mirror, and the image light beam forming a projecting point on a projecting plane; enabling the reflecting mirror to swing, so as to enable the image light beam to swing, and the projecting point scanning back and forth on the projecting plane, and generating an input image; in a first time of complete scanning, when receiving a reflected light beam, judging a first swing angle of the image light beam in a first direction; in the first time of complete scanning, detecting whether the reflected light beam is received when the image light beam is located at a second swing angle of the first direction, and setting the situation as a first detecting result; in a second time of complete scanning, detecting whether the reflected light beam is received when the image light beam is located at the first swing angle of the first direction, and setting the situation as a second detecting result; in the second time of complete scanning, detecting whether the reflected light beam is received when the image light beam is located at the second swing angle of the first direction, and setting the situation as a third detecting result; and judging whether a keying input action occurs according to the first detecting result, the second detecting result, and the third detecting result.

In an embodiment, the present invention further provides a virtual projecting input system, which includes: a projecting device, including a reflecting mirror module, used to emit and swing an image light beam, so that the image light beam forms a projecting point on a projecting plane, and the projecting point scans back and forth on the projecting plane, so as to generate an input image, in which the reflecting mirror module has a frequency signal corresponding to a swing frequency of the reflecting mirror module; a light detector, used to detect a reflected light of the image light beam to a touch object, and generate a triggering signal; a frequency signal generating unit, used to generate a detecting signal according to the triggering signal; and a phase analyzer, used to analyze a phase difference between the detecting signal and the frequency signal, and calculate an input position of the touch object according to the phase difference.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
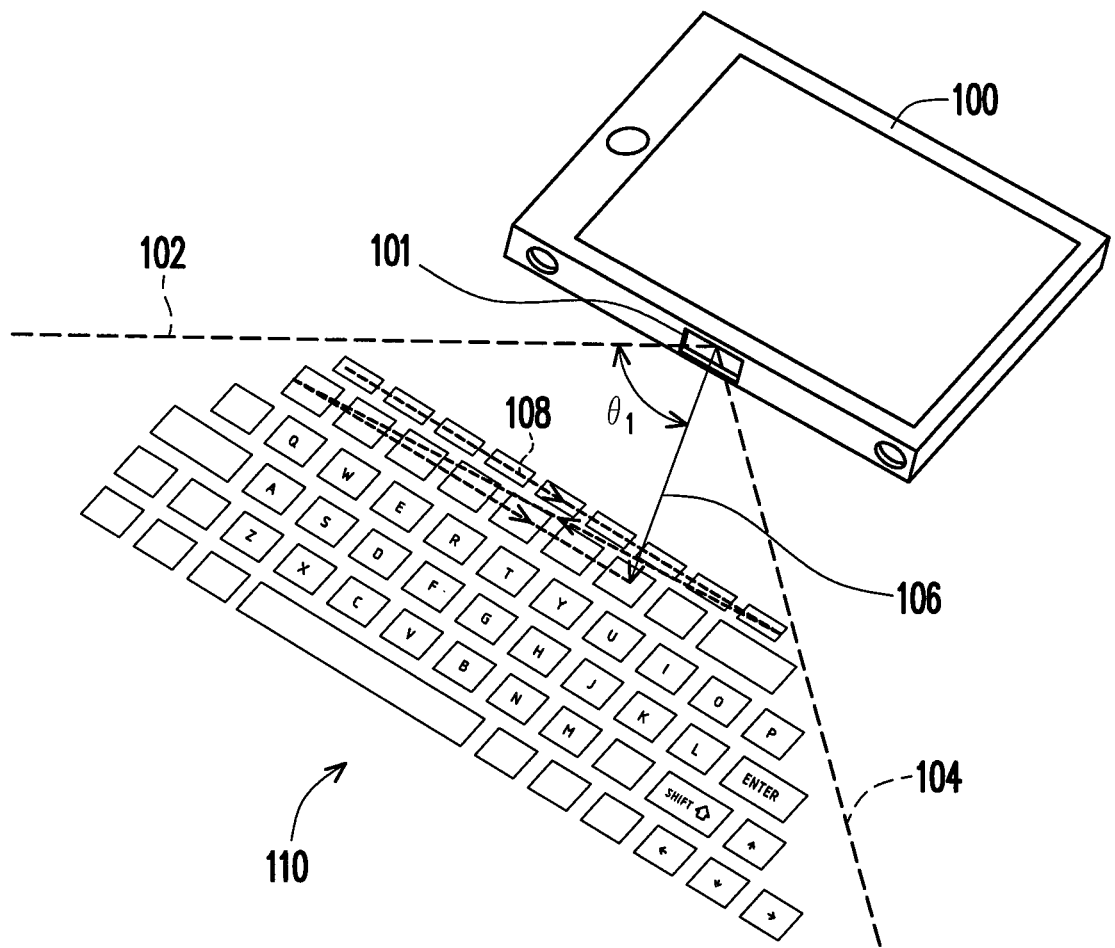
FIGS. 1A-1B are schematic views of image projection of a virtual projecting input system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention is, for example, applied to a laser scanning type projecting system, so as to project an input image of a virtual input device, and detect an input action of a user, thereby generating corresponding control manner. The laser scanning type projecting system usually adopts a reflecting mirror swinging in a two-dimensional direction, in which after a coaxial laser light including red, blue, and green light beams is projected to a projecting plane through an image light beam reflected by the reflecting mirror to form a projecting point, the swinging reflecting mirror may drive the image light beam to swing, so that the projecting point scans back and forth in a projecting area, so as to generate an image by using a principle of human eye visual persistence.

Figure 1B:
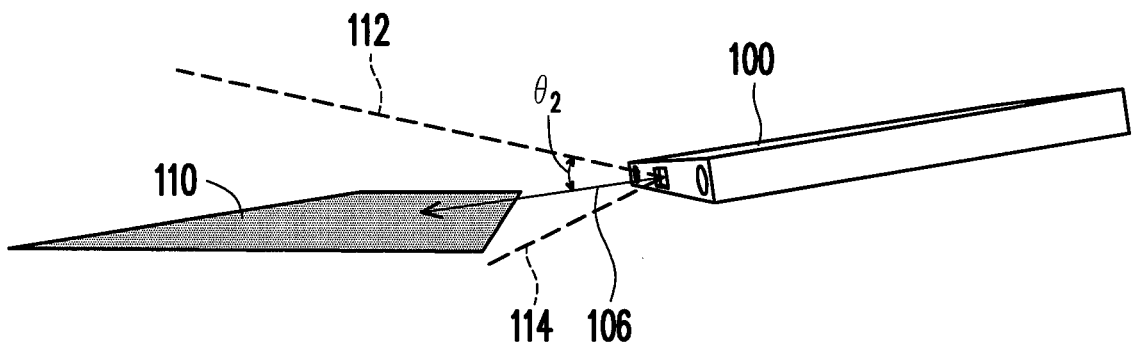

FIGS. 1A-1B are schematic views of image projection of a virtual projecting input system 100 according to an embodiment of the present invention. The virtual projecting input system 100 according to the embodiment of the present invention may be an independent virtual projecting input system, or may also be disposed in an electronic device, for example, a mobile electronic device, or, for example, a tablet computer or a cell phone.

Referring to FIG. 1A, the virtual projecting input system 100 according to the embodiment of the present invention includes a projecting device 101, used to project an input image 110, in which the input image may be a keyboard image, a pointer image, or a picture image. In this embodiment, the input image 110 is, for example, the keyboard image. The projecting device 101 may generate an image light beam 106, so as to form a projecting point on a projecting plane. Further, the image light beam 106 swings in a boundary scope, so that the projecting point scans back and forth in a projecting scope on the projecting plane, so as to generate the input image 110.

Referring to FIG. 1A, a swing scope of the image light beam 106 in a horizontal direction is shown, in which the image light beam 106 swings in a scope of a bounding line 102 and a bounding line 104, and an angle θ1 represents a swing angle of the image light beam 106 relative to the bounding line 102 in the horizontal direction. Meanwhile, referring to FIG. 1B, a swing scope of the image light beam 106 in a vertical direction is shown, in which the image light beam 106 swings in a scope of a bounding line 112 and a bounding line 114, and an angle θ2 represents a swing angle of the image light beam 106 relative to the bounding line 112 in the vertical direction.

In this embodiment, a swing frequency of the image light beam 106 in the horizontal direction is greater than a swing frequency in the vertical direction, so that as shown in FIG. 1A, the projecting point of the image light beam 106 on the projecting plane may scan back and forth on the projecting plane along a scanning sequence 108, so as to form the input image 110 on the projecting plane. When the projecting point completely scans the entire input image 110, the projecting point may scan the entire input image 110 again.

Figure 2:
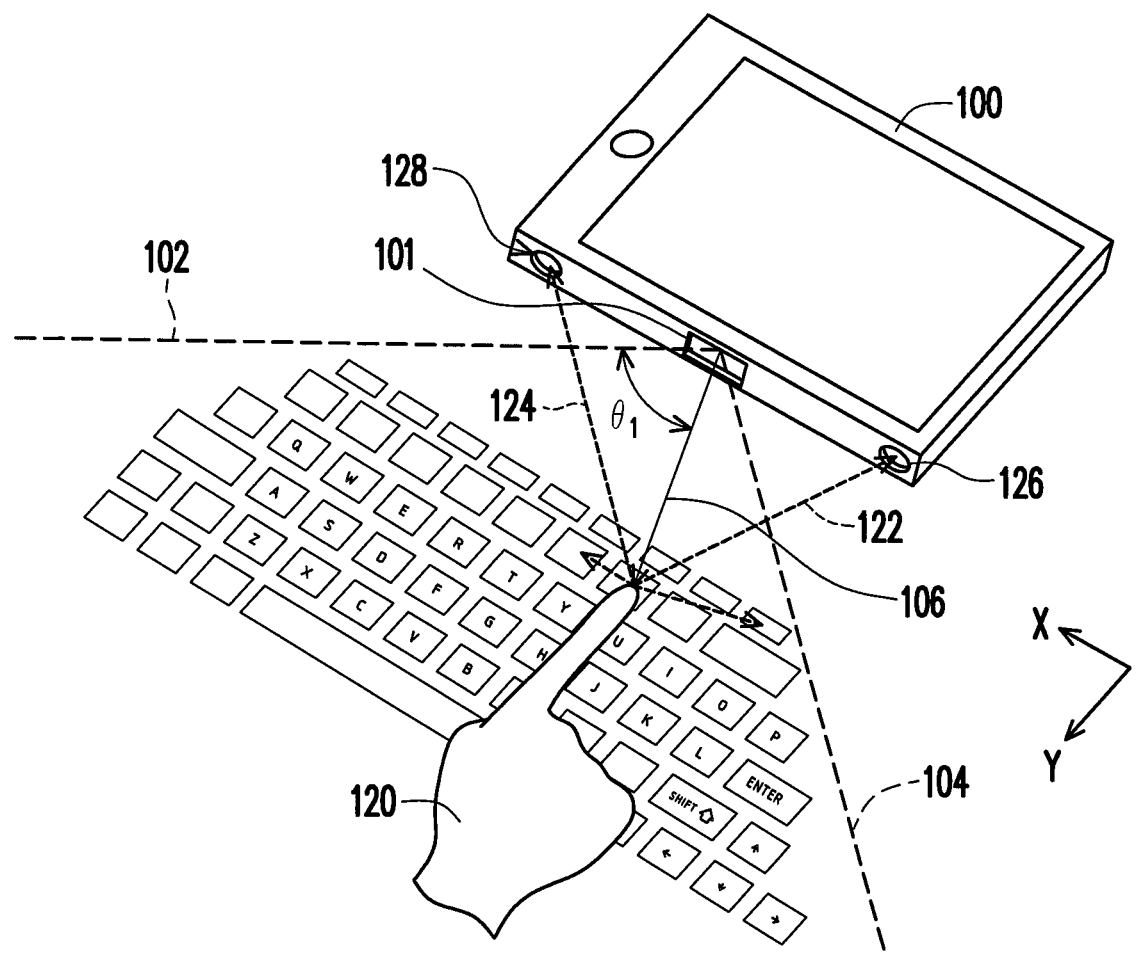
FIG. 2 is a schematic view of input detection of a virtual projecting input system according to an embodiment of the present invention.

Next, referring to FIG. 2, it is a schematic view of input detection of a virtual projecting input system 100 according to an embodiment of the present invention. The virtual projecting input system 100 according to the embodiment of the present invention further includes at least one light detector 126, 128 used to detect occurring of an input action, and send a triggering signal to generate a detecting signal.

As shown in FIG. 2, when a touch object 120 (for example, a finger) touches a keying position (that is, an input position) of the keyboard image 110, the image light beam 106 scanning to the position may be reflected by the finger 120 to generate reflected lights 122 and 124, and the reflected lights are received by light detectors 126 and 128. Here, the light detectors 126 and 128 receiving the reflected lights 122 and 124 may send a triggering signal, representing that an input action occurs.

In addition to detecting whether the input action occurs, the virtual projecting input system 100 needs to further confirm the input position touched by the touch object 120, so as to perform corresponding control behavior. In the following, embodiments of the projecting device 101 and the virtual projecting input system 100 according to the present invention are further illustrated.

Figure 3:
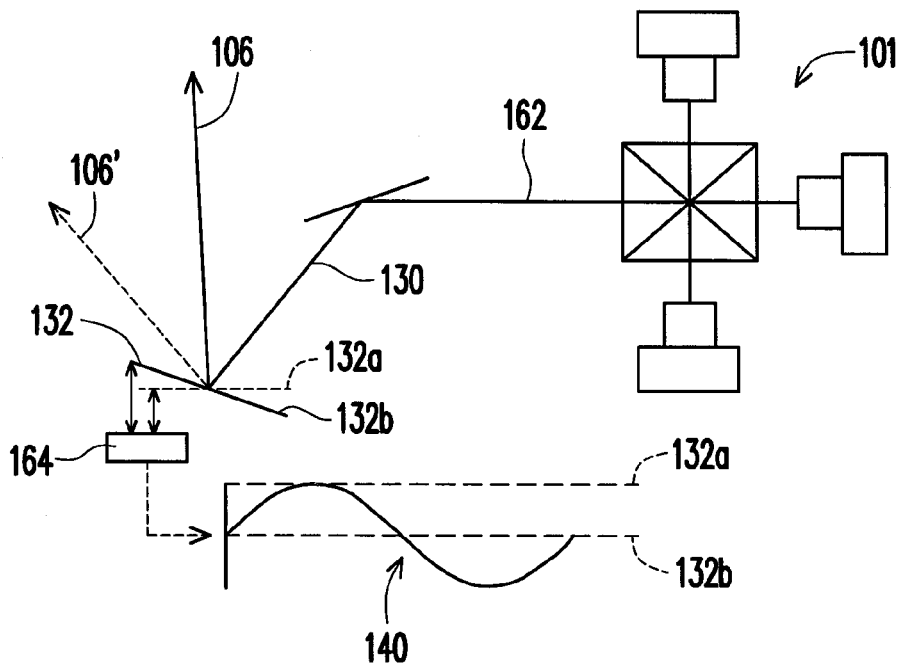
FIG. 3 is a schematic view of a projecting device according to an embodiment of the present invention.
Figure 4:
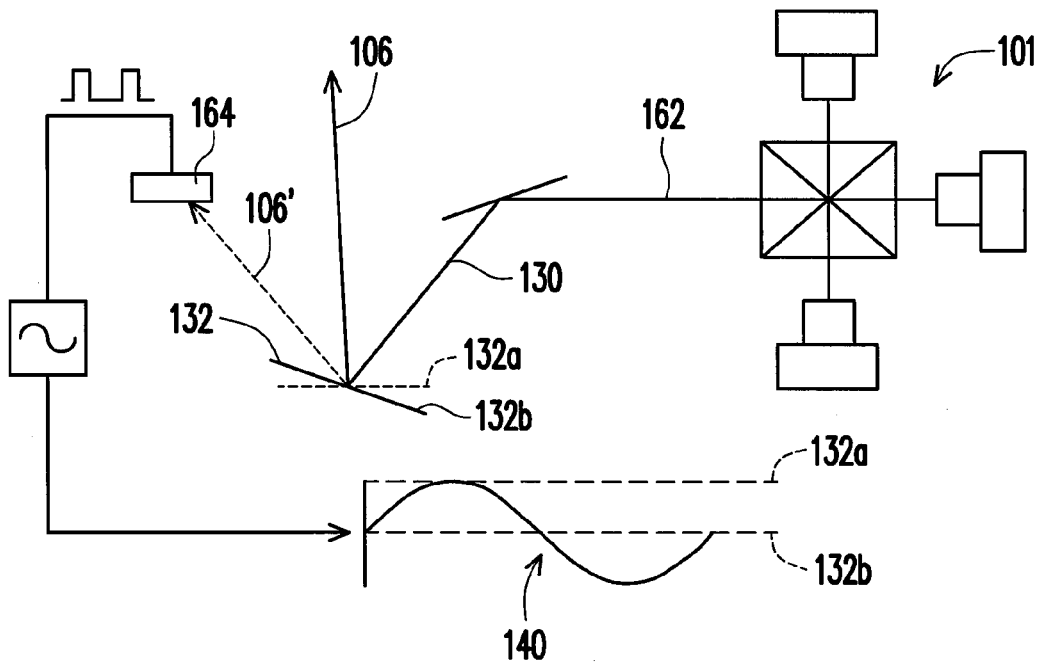
FIG. 4 is a schematic view of a projecting device according to another embodiment of the present invention.

Referring to FIG. 3, it is a schematic view of a projecting device 101 according to an embodiment of the present invention. In the projecting device 101, red, green, and blue image light beams form a coaxial light beam 162, and the coaxial light beam is incident to a reflecting mirror module 132 along an optical axis 130 after being suitably deflected. The reflecting mirror module 132 has two swing directions, so that an image light beam 106 reflected by the reflecting minor module 132 generates a swing scope as shown in FIGS. 1A and 1B. FIG. 3 shows an example in which the image light beam 106 swings in a single direction (for example, swing in a vertical direction of FIG. 1B), in which the reflecting mirror module 132 swings between two positions 132a, 132b, so as to correspondingly generate image light beams 106, 106'. In order to simplify the illustration, in the relevant illustration in the following, only the swing in the vertical direction is used for illustration, but swing in a horizontal direction may also use the same manner, and illustration is not given.

The projecting device 101 according to the embodiment of the present invention further includes a frequency detecting device 164, used to detect a swing frequency of the reflecting minor module 132. In this embodiment, the frequency detecting device 164 is a capacitance electrode, and forms a capacitor with the reflecting minor module 132, for detecting the swing frequency of the reflecting minor module 132. As shown in FIG. 3, when the reflecting mirror module 132 swings, a capacitance value may be changed, so that the change of the capacitance value may be obtained through a voltage signal, and a frequency signal 140 corresponding to the swing frequency of the reflecting mirror module 132 is generated.

In the present invention, the manner of obtaining the frequency signal 140 corresponding to the swing frequency of the reflecting mirror module 132 is not only limited to the manner of using the capacitance electrode. Referring to FIG.

4, it is a schematic view of a projecting device 101 according to another embodiment of the present invention. In this embodiment, a frequency detecting device 164 is an optical detector, used to detect a specific emitting angle of a reflected image light beam 106, and generate a square wave signal. By converting the square wave signal to a sine wave signal, a frequency signal 140 corresponding to a swing frequency of a reflecting mirror module 132 may be obtained. Therefore, the present invention does not limit a method for detecting the frequency signal of the swing of the reflecting mirror module 132.

In addition, as described above, by detecting the change of the swing of the reflecting mirror module 132, the frequency signal 140 similar to a sine wave may be obtained. The frequency signal 140 is corresponding to a swing amount of the reflecting mirror module 132 and a swing angle of the image light beam 106. Further, the swing angle of the image light beam 106 represents a position of a current scanning point, so that the frequency signal 140 may also be corresponding to the position of the scanning point of the image light beam 106.

Figure 5:
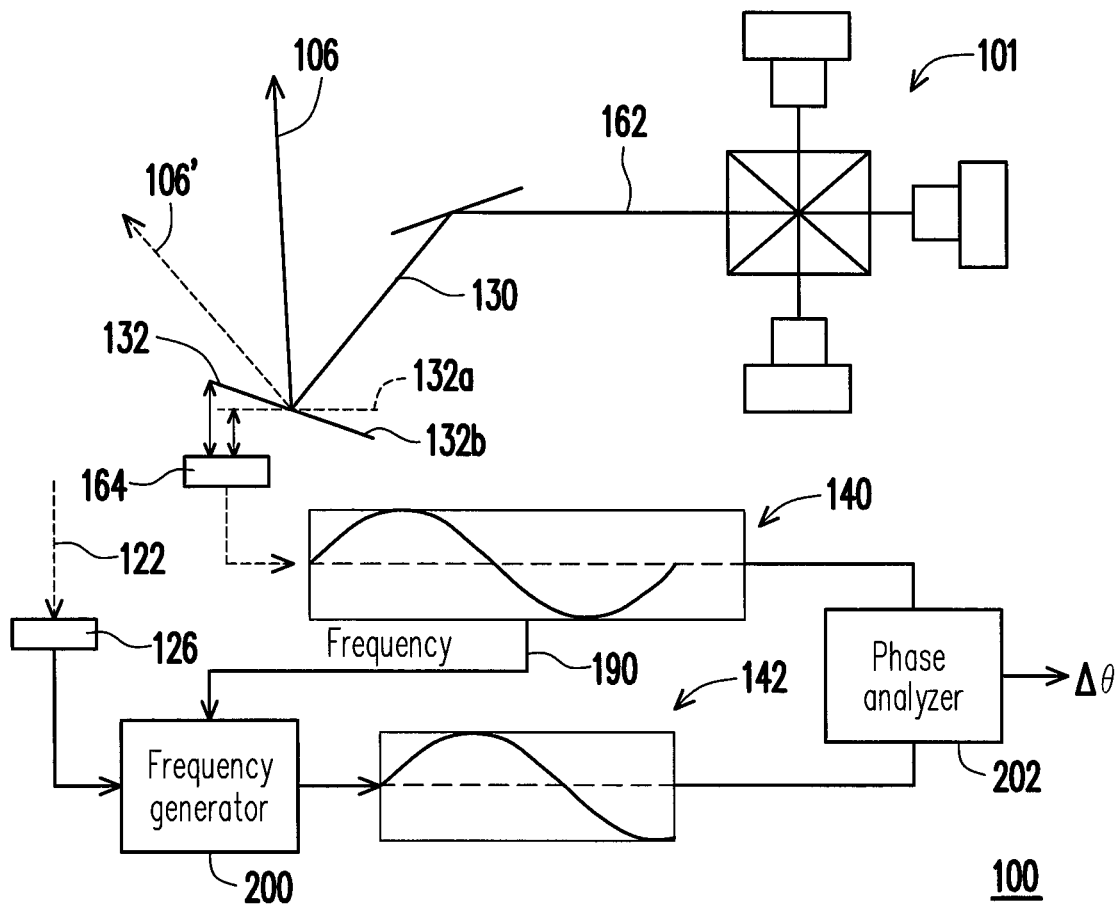
FIG. 5 is a schematic view of a virtual projecting input system according to an embodiment of the present invention.

Next, referring to FIG. 5, it is a schematic view of a virtual projecting input system 100 according to an embodiment of the present invention. In addition to the projecting device 101, the virtual input system 100 according to the embodiment of the present invention further includes a frequency generator 200 and a phase analyzer 202.

When a touch object 120 touches a keying position (that is, an input position) of a keyboard image 110, an image light beam 106 scanning to the position may be reflected by the finger 120 to generate reflected lights 122 and 124, and the reflected lights are received by light detectors 126 and 128. Here, the light detectors 126 and 128 receiving the reflected lights 122 and 124 may send a triggering signal to a frequency generator 200, representing that an input action occurs (as shown in FIG. 5). Next, the frequency generator 200 may generate a detecting signal 142 having a frequency being the same as a frequency signal 140 or forming a fixed frequency proportion relation with the frequency signal 140, according to a frequency value 190 of the frequency signal 140 of swing of the reflecting mirror module 132. Next, the frequency signal 140 and the detecting signal 142 are input to a phase analyzer 202, and through analysis of the phase analyzer 202, a phase difference $\Delta\theta$ between the frequency signal 140 and the detecting signal 142 is obtained. According to the phase difference $\Delta\theta$, the input position of the touch object 120 may be calculated.

Figure 6:
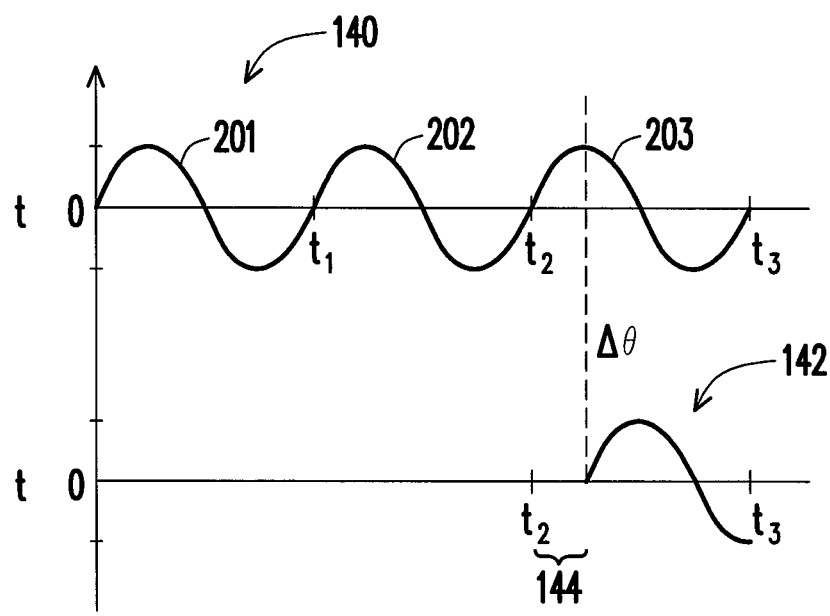
FIG. 6 is a schematic view of a frequency signal and a detecting signal according to an embodiment of the present invention.

Referring to FIG. 6, it is a schematic view of a frequency signal 140 and a detecting signal 142 according to an embodiment of the present invention. A frequency signal 140 obtained by detecting change of swing of a reflecting mirror module 132 is used as a reference signal. The frequency signal 140 has a plurality of repeat sine waves 201, 202, 203, and each sine wave 201, 202, 203 represents one time of swinging of the reflecting mirror module 132. Further, when detecting a reflected light generated by a touch object, a light detector triggers a frequency signal generator, so as to generate a detecting signal 142 with a frequency being the same as that of the frequency signal 140 or forming a fixed proportion relation with the frequency signal 140, but since a trigger point is generated when the reflected light is detected, the detecting signal 142 has delay time and has a phase difference $\Delta\theta$ relative to the frequency signal 140. As shown in FIG. 6, a start point of the detecting signal 142 and a corresponding sine wave start point (time t2) in the frequency signal 140 have a time difference 144. Through the time difference 144 and the phase difference $\Delta\theta$ of the corresponding waveform start point positions, a swing amount of the reflecting mirror module 132 and a swing angle of an image light beam 106 may be obtained, so as to predict an input position of a touch object 120.

In the illustration of the above embodiment, the swing of the reflecting mirror module 132 in a single direction is set as an example, so as to predict the input position of the touch object 120 in the single direction (for example, a Y direction). However, for the swing of the reflecting mirror module 132 in another direction, detection may be performed by adopting the same method, and the input position of the touch object 120 in another direction (or example, an X direction) may be derived.

Figure 7:
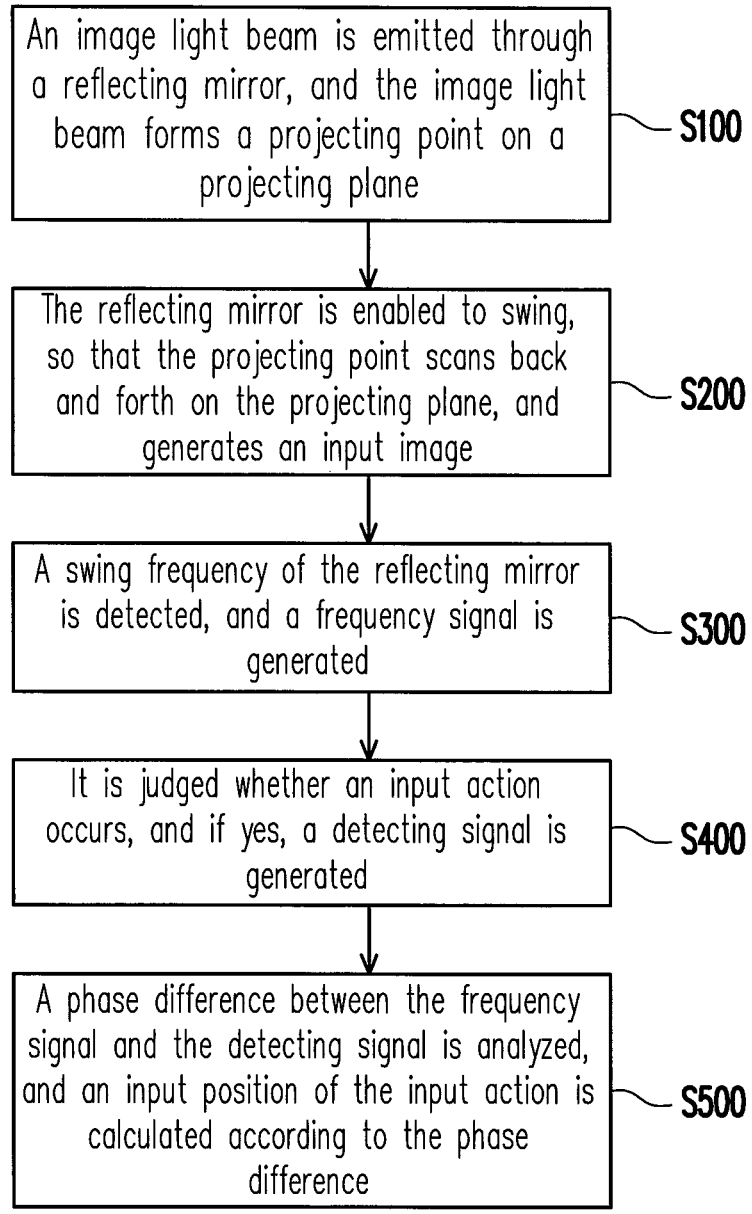
FIG. 7 is a schematic flow chart of an input detecting method of a virtual projecting input system according to an embodiment of the present invention.

Referring to FIG. 7, it is a schematic flow chart of an input detecting method of a virtual projecting input system according to an embodiment of the present invention. The input detecting method according to the embodiment of the present invention includes the following steps. In Step S100, an image light beam is emitted through a reflecting minor, and the image light beam forms a projecting point on a projecting plane. In Step S200, the reflecting mirror is enabled to swing, so as to enable the image light beam to swing, and the projecting point scans back and forth on the projecting plane, and generates an input image. In Step S300, a swing frequency of the reflecting minor is detected, and a frequency signal is generated. Next, in Step S400, it is judged whether an input action occurs, and if yes, a detecting signal is generated. In Step S500, a phase difference between the frequency signal and the detecting signal is analyzed, and an input position of the input action is calculated according to the phase difference.

In Step S400 of the embodiment, it is judged whether the input action occurs according to whether a light detector receives a reflected light. If the reflected light is received, it is judged that the input action occurs, and a frequency signal generator is triggered to generate a detecting signal. However, in another embodiment of the present invention, it is further judged whether a keying action occurs, so as to judge whether the input action occurs, so that a result of detecting the input action becomes more accurate, thereby preventing misjudgment.

Generally, when performing a "keying" action, a user may perform three actions being "finger up", "finger down", and "finger up". Other fingers not performing the typing action do not have the above successive actions.

Figure 8A:
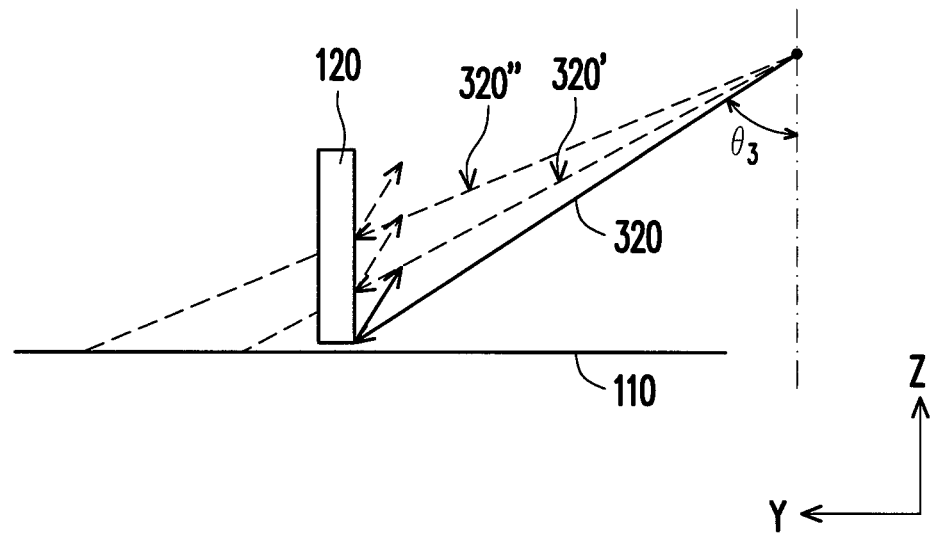
FIGS. 8A-8B are schematic views of judging a keying input action according to an embodiment of the present invention.
Figure 8B:
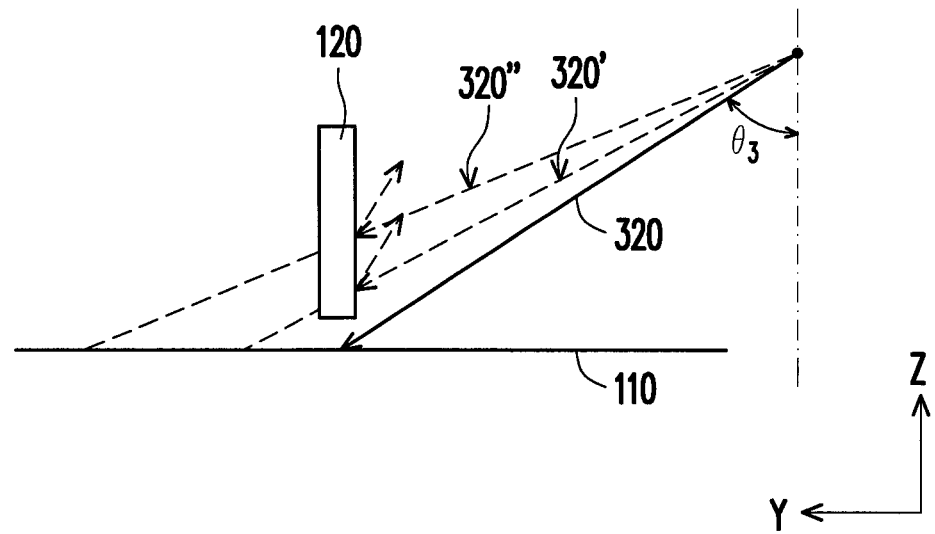

FIGS. 8A-8B are schematic views of judging a keying input action according to an embodiment of the present invention.

Referring to FIG. 8A, it is a schematic view in which when a touch object 120 is in a state of "down", image light beams 320, 320', 320" are respectively located at different swing angles $\theta3$ of a vertical direction. In this embodiment, the vertical swing angle $\theta3$ of the image light beam 320 is defined as an included angle with a Z axis. It is assumed in a single time of complete scanning, that is, when a projecting point of the image light beam completely scans a scope of an entire input image, the vertical swing angle $\theta3$ is changed from a small angle to a large angle and is corresponding to a different position of a Y axis. In other words, for the image light beam 320 located at the first swing angle $\theta3$ of the vertical direction, a distance (that is, a Y axis distance) between a projecting point and a virtual projecting input system is smaller than a distance between a projecting point of the image light beam 320' located at the second swing angle $\theta3$ of the vertical direction and the virtual projecting input system. As shown in FIG. 8A, when the touch object 120 is in the "down" state, the three image light beams 320, 320', and 320" having gradually increasing vertical swing angles θ3 are reflected by the touch object 120, so as to generate reflected lights.

Referring to FIG. 8B, it is a schematic view in which when the touch object 120 is in a state of "up", the image light beams 320, 320', 320" are respectively located at the different swing angles θ3 of the vertical direction. Here, FIGS. 8B and 8A belong to different times of complete scanning. As shown in FIG. 8B, when the touch object 120 is in the state of "up", among the three image light beams 320, 320', 320" having gradually increasing vertical swing angles θ3, only the image light beam 320 having the projecting point located on the input position is not reflected by the touch object 120, and the other two image light beams 320' and 320" may be reflected by the touch object 120, so as to generate the reflected lights.

Figure 9:
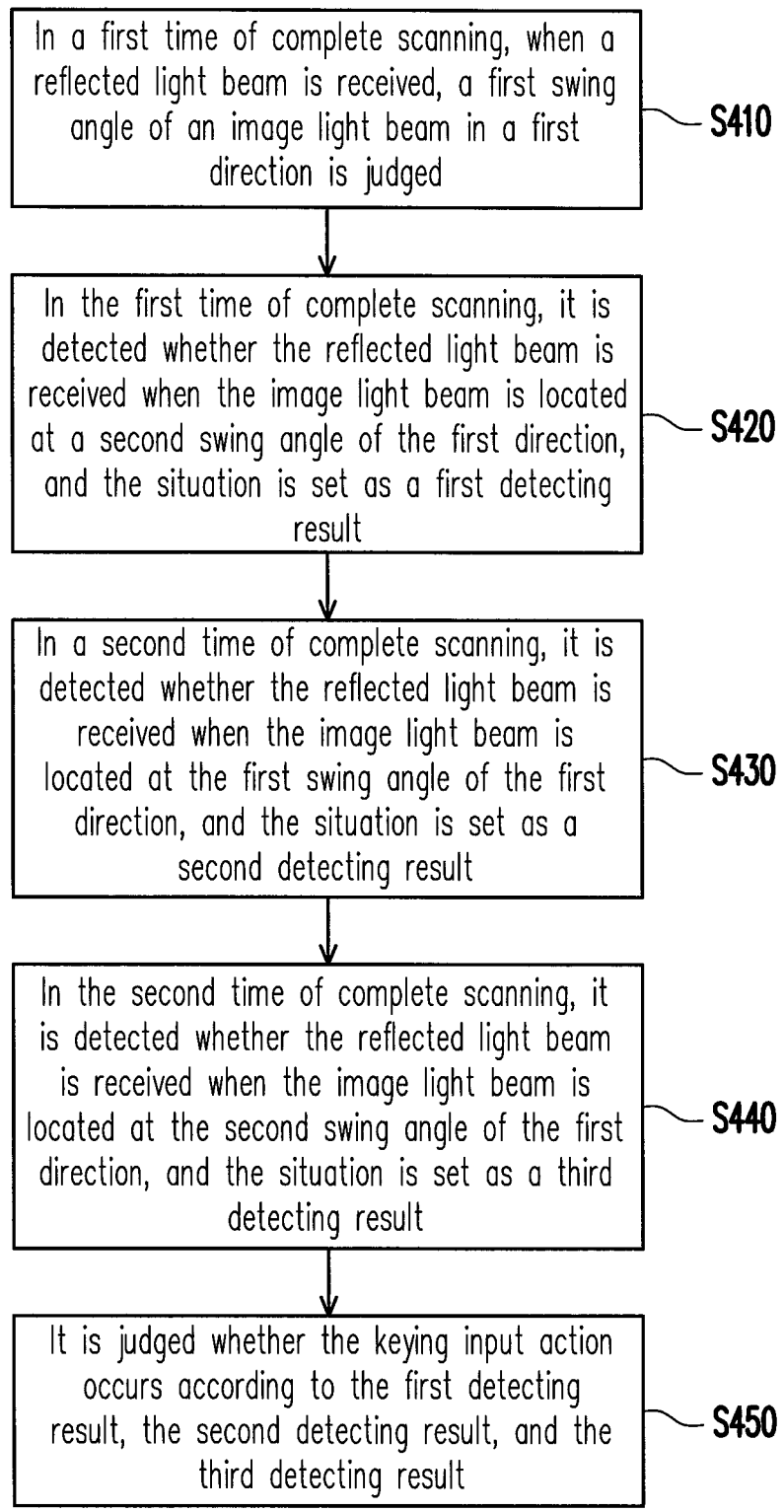
FIG. 9 is a schematic flow chart of a method for judging a keying input action according to an embodiment of the present invention.

Referring to FIG. 9, it is a schematic flow chart of a method for judging a keying input action according to an embodiment of the present invention. The method for judging the keying input action according to the embodiment of the present invention includes the following steps. In Step S410, in a first time of complete scanning, when a reflected light beam is received, a first swing angle of an image light beam in a first direction is judged. In Step S420, in the first time of complete scanning, it is detected whether the reflected light beam is received when the image light beam is located at a second swing angle of the first direction, and the situation is set as a first detecting result. Next, in Step S430, in a second time of complete scanning, it is detected whether the reflected light beam is received when the image light beam is located at the first swing angle of the first direction, and the situation is set as a second detecting result. In Step S440, in the second time of complete scanning, it is detected whether the reflected light beam is received when the image light beam is located at the second swing angle of the first direction, and the situation is set as a third detecting result. In Step S450, it is judged whether the keying input action occurs according to the first detecting result, the second detecting result, and the third detecting result.

In the embodiment of the method for judging the keying input action, in the first time of complete scanning, when receiving the reflected light beam, a light detector generates a triggering signal input to a frequency signal generating unit, so as to generate a first detecting signal. When it is judged that the keying input action occurs, the first detecting signal is set as a detecting signal, used to perform phase analysis with the frequency signal.

In the embodiment of the method for judging the keying input action, when the image light beam is located at the first swing angle, a projecting point and a virtual projecting input system have a first distance, and when the image light beam is located at the second swing angle, the projecting point and the virtual projecting input system have a second distance, in which the first distance is smaller than the second distance. Further, when the first detecting result and the third detecting result are that the reflected light beam is received, and the second detecting result is that the reflected light beam is not received, it is judged that the keying input action occurs.

In a virtual projecting input system and an input detecting method thereof according to the present invention, whether keying input occurs and a keying input position may be simply detected. When it intends to more accurately judge a keying input action, it is judged whether a reflected light occurs in successive complete scanning and under the same neighboring scanning angle.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An input detecting method, used for input detection of a virtual projecting input system, comprising:
   emitting an image light beam through a reflecting mirror, and the image light beam forming a projecting point on a projecting plane;
   enabling the reflecting mirror to swing, so as to enable the image light beam to swing, and the projecting point scanning back and forth on the projecting plane to generate an input image;
   detecting a swing frequency of the reflecting mirror to generate a frequency signal;
   judging whether or not an input action occurs, and if yes, generating a detecting signal; and
   analyzing a phase difference between the frequency signal and the detecting signal, and calculating an input position of the input action according to the phase difference.

2. The input detecting method according to claim 1, wherein the frequency signal and the detecting signal are at a same frequency or have a fixed proportional frequency relation.

3. The input detecting method according to claim 1, wherein the step of judging whether the input action occurs comprises:
   detecting whether or not a reflected light is received; and
   if yes, judging that the input action occurs, and triggering a frequency signal generator to generate the detecting signal.

4. The input detecting method according to claim 1, wherein the step of judging whether or not the input action occurs comprises:
   in a first time of complete scanning, when receiving a reflected light beam, judging a first swing angle of the image light beam in a first direction;
   in the first time of complete scanning, detecting whether the reflected light beam is received when the image light beam is located at a second swing angle of the first direction, and then setting as a first detecting result;
   in a second time of complete scanning, detecting whether the reflected light beam is received when the image light beam is located at the first swing angle of the first direction, and then setting as a second detecting result;
   in the second time of complete scanning, detecting whether the reflected light beam is received when the image light beam is located at the second swing angle of the first direction, and then setting as a third detecting result; and
   judging whether the keying input action occurs according to the first detecting result, the second detecting result, and the third detecting result.

5. The input detecting method according to claim 4, further comprising:
   in the first time of complete scanning, when receiving the reflected light beam, generating a first detecting signal, and
   when judging that the keying input action occurs, setting the first detecting signal as the detecting signal.

6. The input detecting method according to claim 4, wherein the complete scanning is that the projecting point completely scans a scope of the input image at a single time.

7. The input detecting method according to claim 4, wherein when the image light beam is located at the first swing angle of the first direction, the projecting point and the virtual projecting input system comprise a first distance, and when the image light beam is located at the second swing angle of the first direction, the projecting point and the virtual projecting input system comprise a second distance, wherein the first distance is smaller than the second distance.

8. The input detecting method according to claim 7, wherein when the first detecting result and the third detecting result are that the reflected light is received, and the second detecting result is that the reflected light is not received, occurring of the keying input action is judged.

9. An input detecting method, used for input detection of a virtual projecting input system, comprising:
   emitting an image light beam through a reflecting mirror, and the image light beam forming a projecting point on a projecting plane;
   enabling the reflecting mirror to swing, so as to enable the image light beam to swing, and the projecting point scanning back and forth on the projecting plane, and generating an input image;
   in a first time of complete scanning, when receiving a reflected light beam, judging a first swing angle of the image light beam in a first direction;
   in the first time of complete scanning, detecting whether the reflected light beam is received when the image light beam is located at a second swing angle of the first direction, and then setting as a first detecting result;
   in a second time of complete scanning, detecting whether the reflected light beam is received when the image light beam is located at the first swing angle of the first direction, and then setting as a second detecting result;
   in the second time of complete scanning, detecting whether the reflected light beam is received when the image light beam is located at the second swing angle of the first direction, and then setting as a third detecting result; and
   judging whether a keying input action occurs according to the first detecting result, the second detecting result, and the third detecting result.

10. The input detecting method according to claim 9, further comprising:
   detecting a swing frequency of the reflecting mirror, and generating a frequency signal;
   if judging that the keying input action occurs, generating a detecting signal; and
   analyzing a phase difference between the frequency signal and the detecting signal, and calculating an input position of the input action according to the phase difference.

11. The input detecting method according to claim 10, wherein the frequency signal and the detecting signal comprise the same frequency or form a fixed frequency proportion relation.

12. The input detecting method according to claim 10, wherein in the first time of complete scanning, when receiving the reflected light beam, generating a first detecting signal, and when judging that the keying input action occurs, setting the first detecting signal as the detecting signal.

13. The input detecting method according to claim 9, wherein the complete scanning is that the projecting point completely scans a scope of the input image at a single time.

14. The input detecting method according to claim 9, wherein when the image light beam is located at the first swing angle of the first direction, the projecting point and the virtual projecting input system comprise a first distance, and when the image light beam is located at the second swing angle of the first direction, the projecting point and the virtual projecting input system comprise a second distance, wherein the first distance is smaller than the second distance.

15. The input detecting method according to claim 14, wherein when the first detecting result and the third detecting result are that the reflected light is received, and the second detecting result is that the reflected light is not received, occurring of the keying input action is judged.

16. A virtual projecting input system, comprising:
   a projecting device, comprising a reflecting mirror module, used to emit and swing an image light beam, so that the image light beam forms a projecting point on a projecting plane, and the projecting point scans back and forth on the projecting plane, so as to generate an input image, wherein the reflecting mirror module comprises a frequency signal corresponding to a swing frequency of the reflecting mirror module;
   a light detector, used to detect a reflected light of the image light beam to a touch object, and generate a triggering signal;
   a frequency signal generating unit, used to generate a detecting signal according to the triggering signal; and
   a phase analyzer, used to analyze a phase difference between the detecting signal and the frequency signal, and calculate an input position of the touch object according to the phase difference.

17. The virtual projecting input system according to claim 16, wherein the frequency signal and the detecting signal comprise the same frequency or form a fixed frequency proportion relation.

18. The virtual projecting input system according to claim 16, further comprising a frequency detecting device, used to detect the swing frequency of the reflecting mirror module.

19. The virtual projecting input system according to claim 18, wherein the frequency detecting device is a capacitance electrode, and form a capacitor with the reflecting mirror module, for detecting the swing frequency of the reflecting mirror module.

20. The virtual projecting input system according to claim 18, wherein the frequency detecting device is an optical detector, used to detect the swing frequency of the reflecting mirror module.

* * * * *